United States Patent [19]
Sandstedt

[11] 4,259,746
[45] Mar. 31, 1981

[54] ELECTRICAL COMMUNICATIONS SYSTEM

[76] Inventor: Gary O. Sandstedt, 3837 Harrison Blvd., Kansas City, Mo. 64109

[21] Appl. No.: 88,332

[22] Filed: Oct. 26, 1979

[51] Int. Cl.³ .............................................. H04B 9/00
[52] U.S. Cl. ...................................... 455/600; 375/37; 455/612; 455/613; 455/617
[58] Field of Search ............... 455/613, 600, 612, 617, 455/39, 41; 375/37

[56] References Cited

U.S. PATENT DOCUMENTS

| | | | |
|---|---|---|---|
| 3,462,554 | 8/1969 | Steel | 370/69 |
| 3,480,733 | 11/1969 | Morita | 370/75 |
| 3,699,525 | 10/1972 | Klavins | 364/200 |
| 3,838,412 | 9/1974 | Jones | 455/613 |
| 3,885,217 | 5/1975 | Cintron | 375/42 |
| 3,912,872 | 10/1975 | Callins | 370/92 |
| 4,001,692 | 1/1977 | Fenwick | 371/36 |
| 4,054,794 | 10/1977 | Laughlin | 370/3 |
| 4,061,577 | 12/1977 | Bell | 370/3 |
| 4,092,599 | 5/1978 | Yee | 375/37 |
| 4,120,003 | 10/1978 | Mitchell | 358/86 |
| 4,160,903 | 7/1979 | McKenchie | 455/613 |
| 4,196,450 | 4/1980 | Miller | 358/903 |
| 4,201,907 | 5/1980 | Otten | 455/613 |

*Primary Examiner*—Howard W. Britton
*Attorney, Agent, or Firm*—Brady, O'Boyle & Gates

[57] ABSTRACT

Disclosed is a system for communicating electrical signals, digital and/or analog, from one location to another first over an RF communications link and then secondly over an optical communications link. A first digital memory is included on the transmitter side of the RF communications link so that a plurality of fixed or portable signal sources can feed data thereto in a desired sequence for subsequent transmission upon demand first to at least one second or interim digital memory at the end of the RF communications link and then to at least one third digital memory at the end of the optical communications link. The third memory is located in a terminal unit, fixed or portable, which is adapted to feed the data transmitted thereto to one or more utilization devices.

36 Claims, 5 Drawing Figures

ELECTRICAL COMMUNICATIONS SYSTEM

BACKGROUND OF THE INVENTION

This invention relates generally to communications apparatus and more particularly to a system whereby both digital and analog signals in any desired combination are transmitted on demand from one or more signal sources to a selected one or more utilization devices.

Communications at radio frequencies over wired and wireless transmission channels are well known. More recently the emergence of fiber optic conductors of light has found utility as a medium for transmitting a signal carrier in the light region of the electromagnetic spectrum. In the case of digital data, memories have also been included at either end for purposes of multiplexing and demultiplexing data from plural sources so that a common channel can be utilized. While these various and sundry systems are adapted to accomplish a wide range of tasks, it is the purpose of the present invention to provide an improvement in such communications systems, particularly for transmitting digital data, originating at diverse signal sources, from one location to another and storing the data for a momentary or predetermined time for subsequent selected utilization by one or more diverse utilization devices.

SUMMARY

The present invention is directed to a system wherein a plurality of data streams originating at separate input signal sources, fixed or portable, are fed to a first random access memory which when loaded is outputted on demand, either automatically or manually, over a first energy type or RF communications link to a second random access memory. The second memory on demand, outputs the data coupled thereto from the first memory over a second energy type, optical or when desirable inductive, communications link to a terminal device including a third random access memory. On demand, the third memory outputs its contents to one or more utilization devices. The means included in the first energy type communications link is also adapted to include means for simultaneously transmitting analog data along with the digital data. In one form, the first and second random access memories on either side of the first type communications link are adapted to remain relatively stationary, whereas the input signal sources and the terminal device including the third random access memory may be selectively a portable or fixed piece of apparatus, depending upon the use intended.

DESCRIPTION OF THE PREFERRED EMBODIMENT

Figure 1:
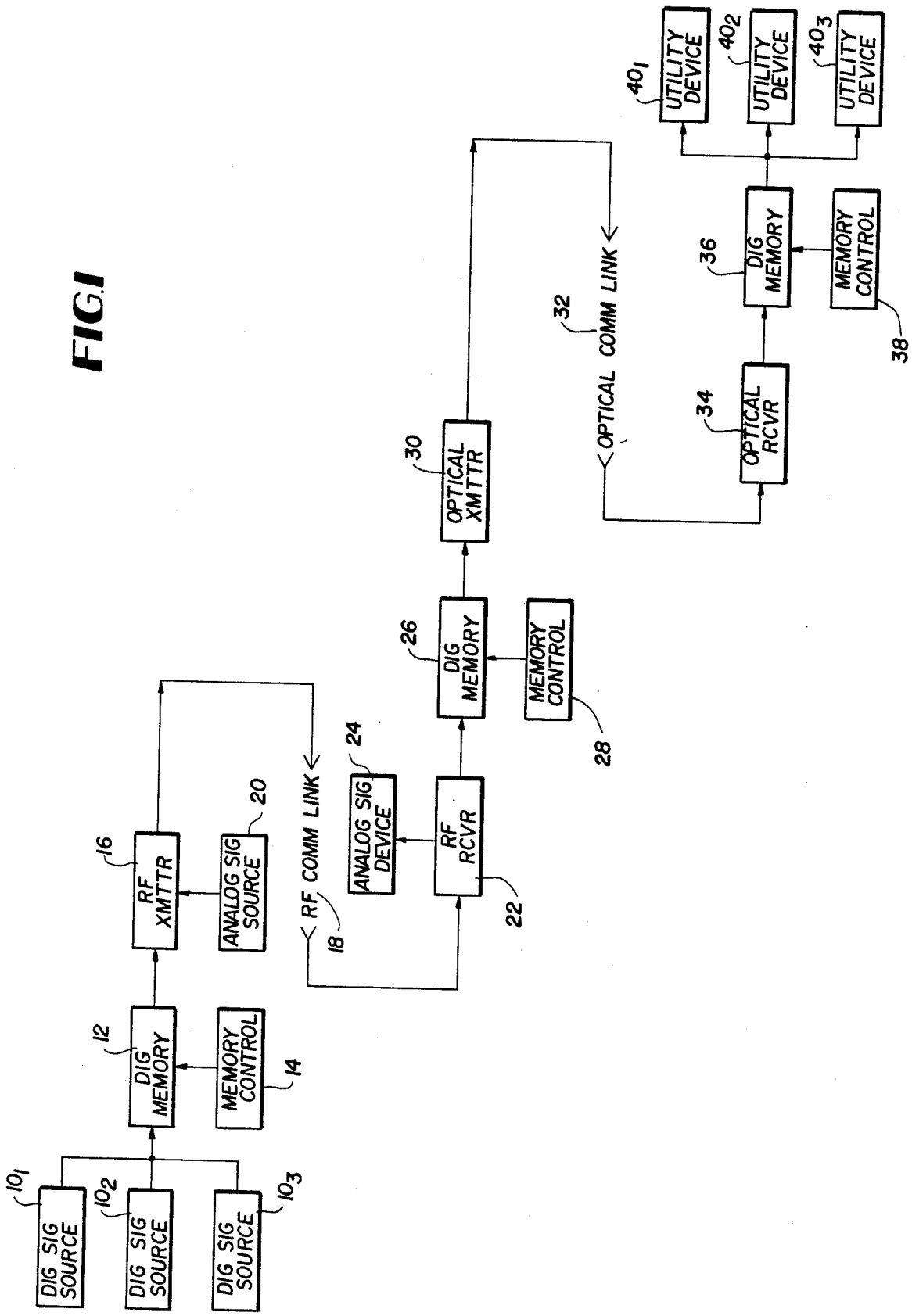
FIG. 1 is a block diagram broadly illustrative of the subject invention.
Figure 5:
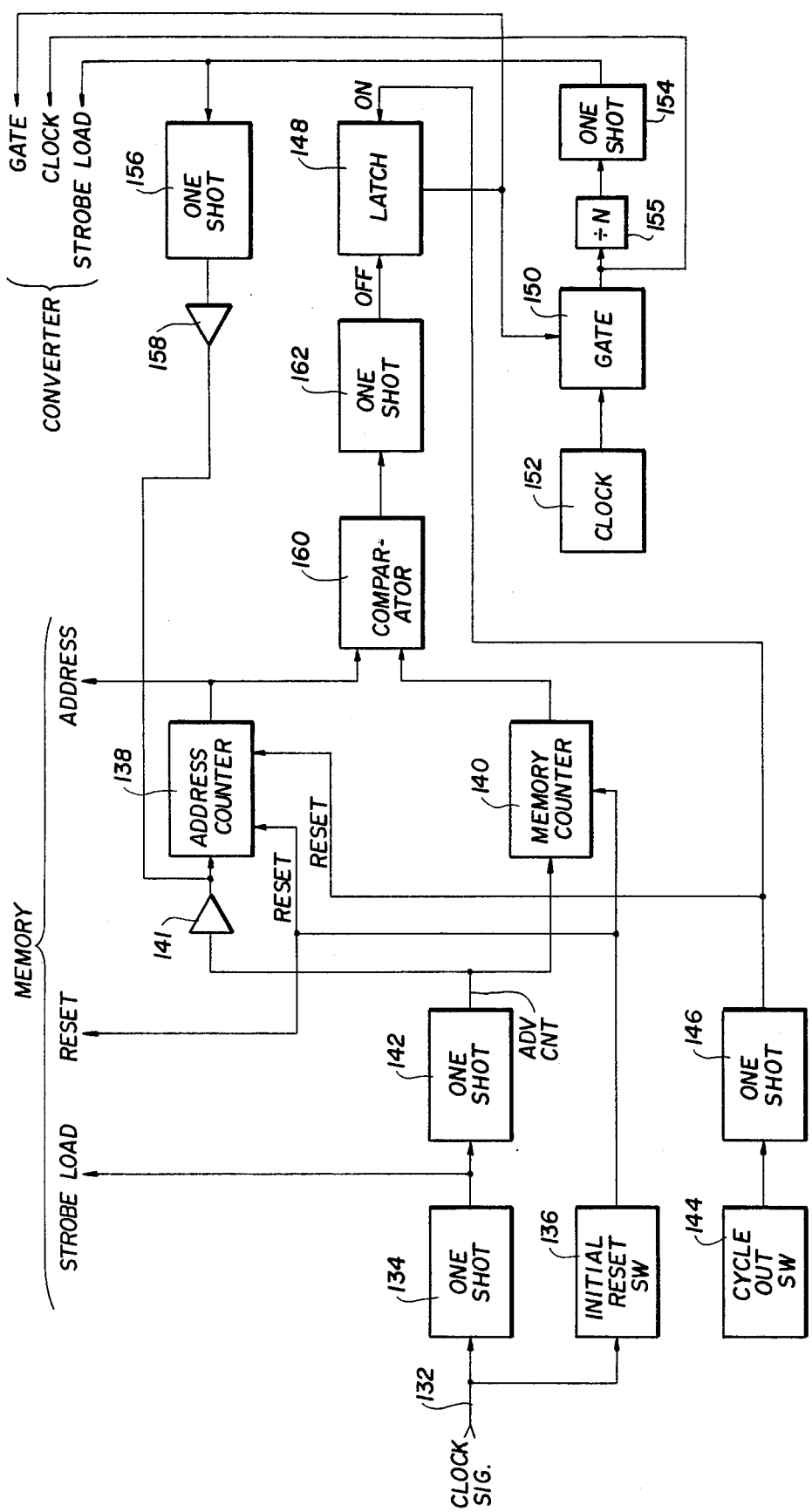
FIG. 5 is a detailed block diagram illustrative of a typical memory control circuit for operating the random access memories shown in FIGS. 2, 3 and 4.

Referring now to the drawings and more particularly to FIG. 1, a plurality of signal sources $10_1$, $10_2$ and $10_3$ are shown coupled to a digital memory 12, preferably a random access memory (RAM) operated by means of a memory controller 14. The memory controller 14, a typical example of which is further disclosed in FIG. 5, is adapted to load data into the RAM 12 and upon demand, either automatically or manually, output its contents in sequence to an RF (first energy type) transmitter 16 where it is modulated onto an RF carrier. The carrier is then coupled to an RF communications link 18 in the form of a signal which is adapted for transmission via a radio/microwave antenna or a coaxial cable. Additionally, an analog signal source 20 which is adapted, for example, to generate an audio and/or video signal, is also applied to the RF transmitter 16 for simultaneous single or multiplexed transmission over the RF communications link 18 with the digital data outputted from the memory 12.

At the far or receiving end of the RF communications link 18 is located an RF receiver 22 which is adapted to demodulate the communications signals on the carrier and accordingly couple the analog signal transmitted to an analog signal utilization device 24 while the digital data outputted from the RAM 12 is fed into a second random access memory 26 under the control of a respective memory controller 28. The memory controller 28 on demand subsequently outputs the contents of the RAM 26 to an optical (second energy type) transmitter 30 where the data is modulated onto a carrier of light energy. The light energy is transmitted over an optical communications link 32 to an optical receiver located in a terminal device, not shown. The light signal is demodulated and the digital data is fed into a third random access memory 36 under the control of its own memory controller 38. Upon demand, the digital memory 36 outputs the digital data fed thereto selectively to one or more utility devices $40_1$, $40_2$ and $40_3$.

What the broad system disclosure of FIG. 1 is intended to show is the concept of first sending digital and/or analog signals originating at a plurality of input signal sources, some or all of which may be portable, over RF communication means utilizing various types of modulation techniques e.g. frequency modulation, phase modulation, amplitude modulation, pulse code modulation, stored either on a real time or long term basis for later optical transmission to a device, either portable or fixed, which is adapted to store the selected signals as necessary and thereafter apply it to predetermined utilization device(s). Particularly, however, digital data in the form of a data stream is adapted to be intermediately or momentarily stored, for selective transfer upon command to the next location. Thus the data from any of the digital signal sources $10_1$, $10_2$ and $10_3$ is first relayed to the digital RAM 26 over the RF link 18 at some appointed time. Thereafter when it is desirable to do so, the data stream is then coupled over the optical communications link 32 to the digital memory 36.

This concept has particular utility, for example, where the optical receiver 34, the digital memory 36 and the memory controller 38 are all included in a portable terminal, not shown, which is adapted to be brought, from time to time, into proximity with the optical transmitter 30, which is located in a fixed installation, also not shown. More particularly, the fixed installation at the RF end and optical transmitter location may consist of a piece of hardware secured to a wall of a building or inside a room with the optical transmitter 30 including at least one light emitting diode or other such device which is adapted to output an IR or pulse/intensity modulated signal. This signal is coupled to a photo pick up device contained in a relatively small portable device which is brought into proximity with and pointed at the light emitting source wherein the light is then directed to the photo pick up device, thus completing the optical link 32. The digital memory 26 in the fixed installation can then be ordered when desirable to transfer its data to the digital memory 36 in the portable device where it is then adapted to be displayed, coupled to a printer, or activate some type of control device.

Figure 2:
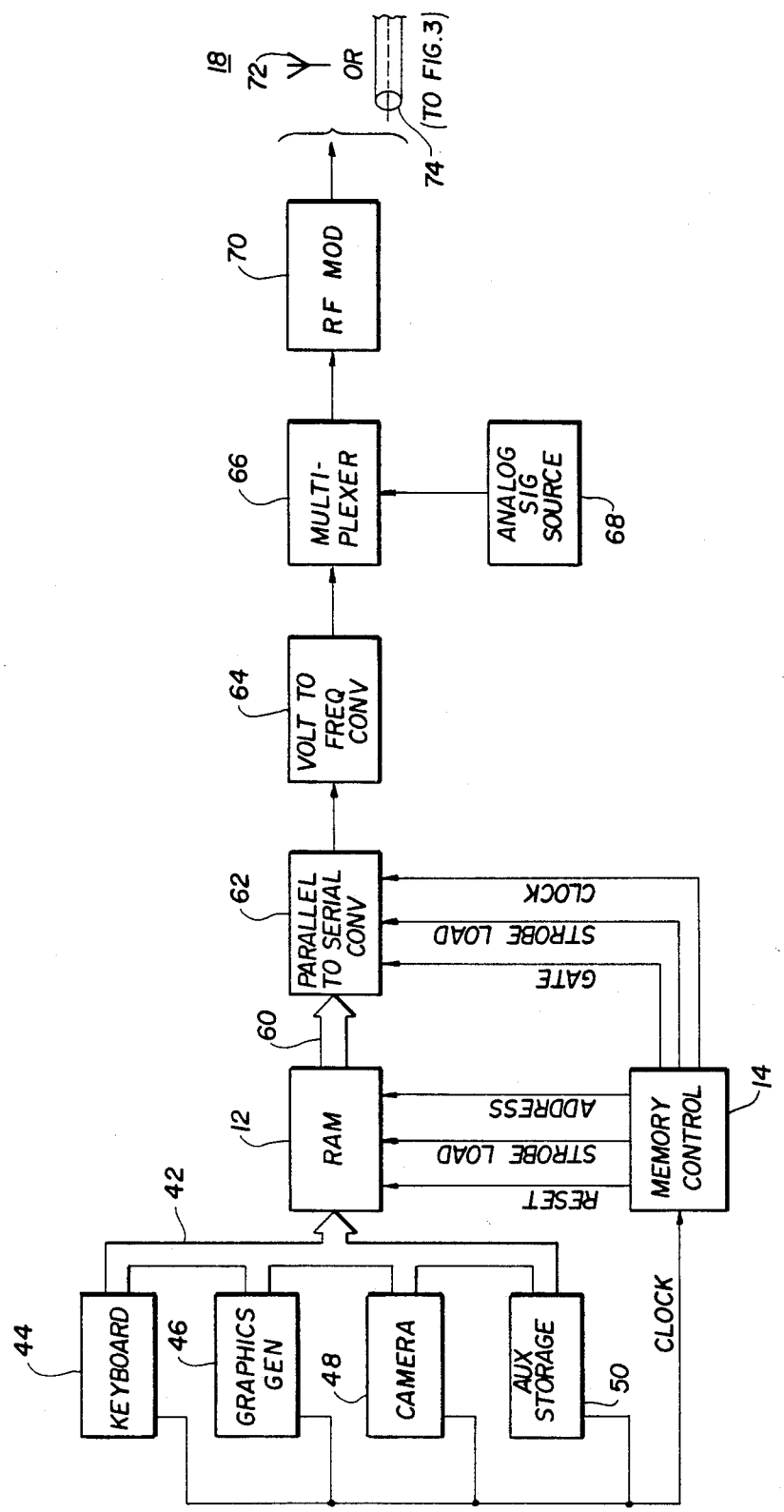
FIG. 2 is a detailed block diagram illustrative of the preferred embodiment of the RF transmission portion of the system shown in FIG. 1.

Referring now to FIG. 2, there is shown in greater detail the input side of the system. Whereas the RAM 12 and the memory controller 14 are as shown in FIG. 1, FIG. 2 is intended to additionally illustrate that a plurality of diverse input signal sources are adapted to feed respective digital data streams to the RAM 12 by means of a data bus 42, which includes, for example, a plurality of parallel data lines. The data bus 42 couples the RAM 12 to the outputs of four input devices; a keyboard 44, a graphics generator 46, a television camera 48 and an auxiliary storage 50 which may be, for example, a read only memory (ROM). The storage 50 may be comprised of disk, tape, bubble, core, semiconductor type of memory of known type. When desirable these input devices may be duplicated and some or all may be made selectively portable and coupling to the RAM 12 effected by way of respective optical input/output ports.

The memory controller 14 is adapted to strobe load the memory addresses of the RAM 12 upon receiving clock signals from the respective signal sources until the desired number of data bytes have been inputted thereto. Upon command, as will be shown when FIG. 5 is considered, the memory controller 14 resets the memory address of the RAM 12 and the data bytes stored therein are coupled in sequence to a multi-line parallel output data bus 60. The data bus 60 feeds into an input gated parallel-to-serial converter 62, which is strobe loaded upon receipt of three control signals i.e. gate, strobe load, and clock signals from the memory controller 14. The parallel-to-serial converter 62 is a well known device, a typical example being a Fairchild F3843 USART (Universal Synchronous or Asynchronous Receiver and Transmitter.) The output from the parallel-to-serial converter 62 is coupled to a frequency shift keying XR-2206 type voltage to frequency converter 64. Coupled to the variable frequency output of the converter 64 is a multiplexer type circuit 66 which is adapted for single or multiplexed operation so that an analog signal from the source 68 can be applied simultaneously along with the FSK output from the converter 64. The signal source 68 may be, for example, an audio signal source. When desirable, it may be comprised of a video signal source.

The output from the multiplexer 66 is coupled to an RF modulator 70 of any selected design. The RF modulator generates an RF carrier signal modulated in accordance with the signals supplied from the circuits 64 and 68. The modulated carrier is then fed to a radiating antenna 72 or when desirable, to a coaxial cable 74. The RF transmission elements shown are not meant to be interpreted in a limiting sense since when desirable other means may also be employed such as, for example, microwave apparatus could also be utilized. Also as noted above, other types of modulation may be resorted to when desirable.

Figure 3:
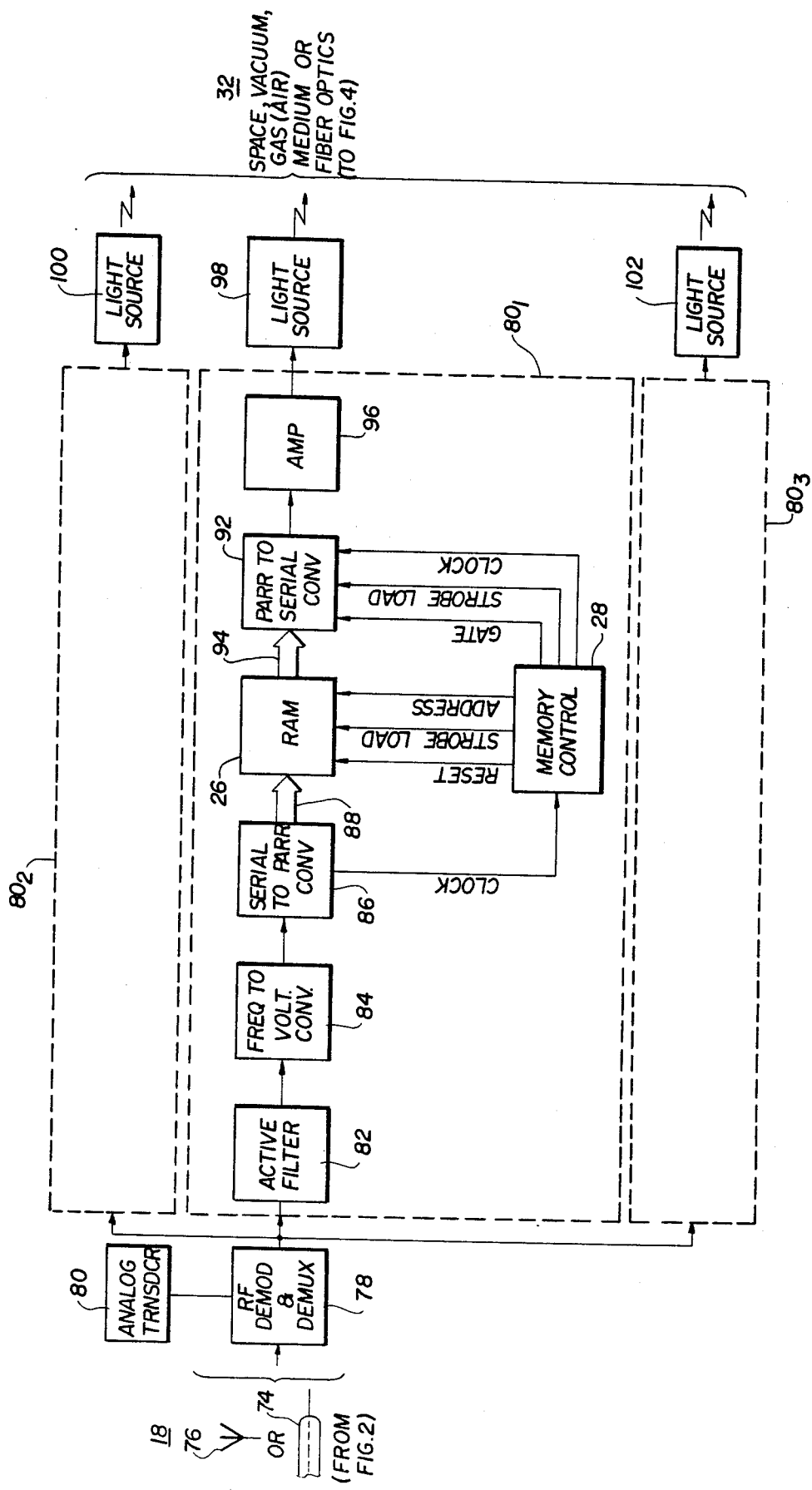
FIG. 3 is a detailed block diagram illustrative of the RF receiver and optical transmitter portion of the system shown in FIG. 1.

Referring now to FIG. 3, the RF communications link 18 is terminated, as shown, either in a receiving antenna 76 or the far end of the co-axial cable 74. The RF signals appearing thereat are coupled to the input of an RF demodulator and demultiplexer 78 which is operable to remove the analog signal from the carrier and couple it to a transducer element 80, which may be, for example, a loud-speaker in the case of an audio signal emanating from the analog signal source 68. The digital data format outputted from the RAM 12 as shown in FIG. 2, is also removed from the carrier and is fed to at least one digital memory module $80_1$ which includes the RAM 26 and its associated memory controller 28 originally shown in FIG. 1. The memory module $80_1$ may be duplicated when desirable to other identical modules $80_2$ and $80_3$. In each instance the respective module includes an active filter 82 which is adapted to be frequency selective so that a routing action can be obtained, when desirable, between the multiple memory units. The active filter 82 is coupled to a frequency to voltage XR-2211 type frequency to voltage converter 84 where the frequency shift keying operation is reversed. The variable voltage signal outputted from the converter 84 is next fed to a serial-to-parallel converter 86 which may also be comprised of a Fairchild F3843 USART inasmuch as it is a duplex device whereby both parallel-to-serial and serial-to-parallel conversions can be implemented thereby. A parallel multi-line data bus 88 couples to the RAM 26 and the multi-bit data stream in the form of bytes are fed into the RAM under the control of the memory controller 28 which is also adapted to receive a clock signal from the serial-to-parallel converter 86. When desirable the serial-to-parallel converter 86 may embody an addressable gate controlling data flow to RAM 26. Once the RAM 26 has been loaded with data from the RAM 12 shown in FIG. 2, the memory controller 28 will cause the memory to become inactive until such time that a cycle out command is provided, either manually or by some desired means, at which time the RAM will output its contents which is then strobe loaded into an input gated parallel-to-serial converter 92 over the data bus 94. The serial data stream outputted from the converter 92 is fed to an amplifier 96 which is adapted to intensity modulate the light output from a respective light emitting source 98, a typical example being a light emitting diode. Each of the other memory modules $80_2$ and $80_3$ also couple to individual light emitting sources 100 and 102 which are respectively modulated in accordance with signals outputted from the respective memories contained therein. The intensity modulated light outputted from the light emitting source 98 and the light emitting sources 100 and 102 when utilized, are launched into the optical communications link 32 which may comprise simply a gaseous medium such as air, or when desirable space or a vacuum, but may also consist of one or more optical fibers 104, which are adapted to couple any one light emitting source to a remote photo pickup device which maybe, for example, a matching photo-diode.

Figure 4:
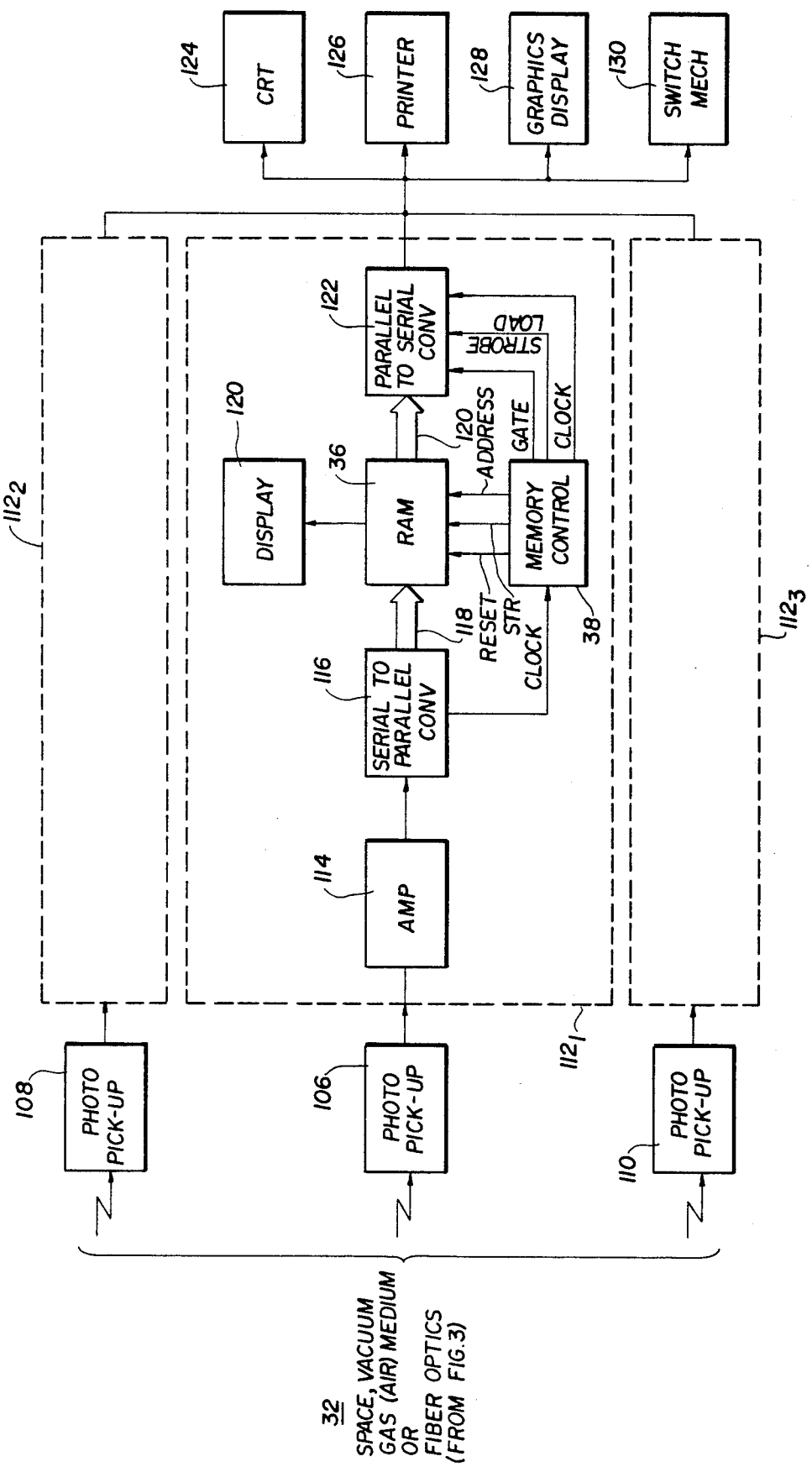
FIG. 4 is a detailed block diagram illustrative of the optical receiver portion of the system shown in FIG. 1.

Turning attention now to FIG. 4, a photo pickup device 106 is coupled to the light emitting source 98 of FIG. 3. Additionally, photo pickups 108 and 110 are adpated to be coupled to light emitting sources 100 and 102 also shown in FIG. 3. While the use of light emitting diodes and the respective photo-diodes is preferred, inductive coupling means can be utilized when desirable for the second energy type communications link. Each of the photo pickup devices 106, 108 and 110 are adapted to form part of and be coupled to respective terminal units $112_1$, $112_2$ and $112_3$, each of which is adapted to include a RAM 36 and memory controller 38 such as shown in FIG. 1.

Each terminal unit 112 includes an amplifier 114 coupled to the respective photo pickup device. The amplifier output is coupled to a serial-to-parallel converter 116 which converts the serial data stream into a parallel data stream which is fed into the RAM 36 via the data bus 118. The memory controller 38 also receives a clock signal from the converter 116 in order to initially reset the memory addresses, strobe the data into the memory and sequentially index the addresses following completion of the storage of each data byte. When desirable, a display device 120 is included. Following receipt of the data into the RAM 36, the memory controller 38 is then adapted on command such as by means of a cycle out switch, not shown, to output the data contained therein onto an output bus 120 where it is strobe loaded into an input gated parallel-to-serial converter 122, whereupon a serial data stream in the form required by one or more utilization devices, is provided. Utilization devices $40_1$, $40_2$, $40_3$ shown in FIG. 1 are shown in FIG. 4 comprising cathode ray tube display 124, an output printer 126, a graphics display 128 or a switch mechanism 130 for controlling an external device, not shown.

Thus the individual random access memories 12, 26 and 36 act in combination with its respective peripheral hardware to store and transfer digital data which is coupled to and from the respective memories in the form of multiple bit data streams or bytes. In order that intelligent management of the data stream flow be provided an illustrative embodiment of the memory controllers 14, 28 and 30 is shown in FIG. 5.

There a clock signal, generated in any one of the data sources 44, 46 ... 50 shown in FIG. 2 or by the serial-to-parallel converters 86 and 116 shown in FIGS. 3 and 4, is coupled to an input lead 132 which is applied to a one-shot circuit 134. This circuit is an electrical circuit for generating a trigger pulse in response to a signal being applied and thereafter automatically resetting itself until the next signal is applied. The one shot circuit 134 accordingly responds to the clock signal applied to generate a memory strobe load signal which is coupled to its associated memory for strobe loading the parallel data presentation or byte into a particular memory address. Additionally, an initial reset switch 136 is included which is adapted to be responsive, for example, to the leading edge of the first clock signal to provide a reset signal for recycling the respective memory to the initial or first address position. Additionally, the initial reset swtich 136 is coupled to an address counter 138 and a memory counter 140 which are reset to the zero count position by the action of the initial reset switch. It should also be pointed out that when desirable the reset switch 136 may be comprised of a manually actuated switch device rather than one being shown as operated in accordance with a leading edge of the clock signal.

A second one-shot circuit 142 is coupled to the one-shot circuit 134 and is adapted to be triggered when circuit 134 resets. The output of the one-shot circuit 142 provides an output pulse which is applied directly to counter 140 and through buffer 141 to counter 138 to advance the count each time a byte of data is entered into the respective memory. This process is repeated until all the desired data bytes are entered into the appropriate addresses.

When the contents of the respective memory is desired to be outputted i.e. translated to its respective output data bus, a cycle out switch 144, included in each memory controller, is actuated on demand either manually or by remote control and operates to trigger a third one-shot circuit 146 which generates a pulse to reset the address counter 138 to a zero count and triggers on a latch 148 which in turn enables the converter's gated input as well as gate circuit 150 coupled to a local source of clock signals 152. The output of gate 150 provides a clock signal for the parallel-to-serial converters. Pulses gated from the local clock source 152 and also divided by a $\div$N counter 155 and are fed to a one-shot circuit 154 which is adapted to strobe load the respective parallel-to-serial converters 62, 92 and 122, respectively. The N count is equal to the number of data lines being inputted from serial-to-parallel converters 86 and 116 to their respective memories 26 and 36. Each time the one-shot circuit 154 restores it triggers one-shot circuit 156 which produces a trigger pulse which is coupled to the address counter 138 through the buffer amplifier 158, thereby causing the address counter 138 to advance the memory to the next address position. On the next clock pulse outputted from the clock 152 the readout process is repeated. This action continues until the count in the address counter 138 matches the previously stored count in the memory counter 140. A comparator circuit 160, coupled to both counters 138 and 140, monitors the counters looking for a match, meaning that on readout the address counter 138 has cycled the memory to the same number of counts read into the memory counter 140 during the read-in phase. When both counts are equal, the comparator circuit 160 triggers another one-shot circuit 162 which produces a trigger signal to trigger off the latch 148, which acts to disable the gate 150, thereby interrupting the output of clock pulses from the clock 152 to the one-shot circuit 154. This causes the readout cycle to stop, meaning that the readout process of the data from the respective memory has been completed.

Thus what has been shown and described is a means for relaying electrical signals such as digital data first over an RF communications link, and then over an optical communications link, so that data can be conveyed from a local source of diverse signals to a remote data terminal having a memory which upon demand can thereafter output the data to one or more selected diverse types of utilization devices.

Having thus shown and described what is at present considered to be the preferred embodiment of the subject invention, modifications and alterations thereto will readily occur to those skilled in the art. It is not desired, therefore, that the invention be limited to the specific arrangements shown and described, but it is intended to cover all such modifications and alterations which fall within the true spirit and scope of the invention as defined by the appended claims.

I claim as my invention:

1. A communications system for electrical signals, comprising in combination:
   a plurality of input signal sources generating respective electrical communications signals;
   first memory means coupled to at least one of said plurality of input signal sources and including control means for controlling the inputting and storing of said electrical communications signals in said first memory means and upon command thereafter outputting said electrical communications signals therefrom;

first energy type transmitter means coupled to said first memory means and being responsive to the electrical communications signals outputted from said first memory means to generate a modulated signal including said electrical communications signals and coupling said carrier signal to a first energy type communications link;

first energy type receiver means coupled to said first energy type communications link and being responsive to said carrier signal to demodulate the carrier signal to reproduce said electrical communications signals;

second memory means coupled to said first energy type receiver means and including control means for controlling the inputting and storing of said electrical communications signals in said second memory means and upon another command, thereafter outputting the stored electrical communications signals from said second memory means;

second energy type transmitter means coupled to said second memory means and being responsive to said electrical signals outputted from said second memory means to generate a modulated carrier signal including said electrical communications signals and coupling said carrier signal to a second energy type communications link;

second energy type receiver means coupled to said second energy type communications link and being responsive to said last recited carrier signal to demodulate the carrier signal to reproduce said electrical communications signals;

third memory means coupled to said second energy type receiver means and including control means for controlling the inputting and storing of said communications signals into said third memory means and upon yet another command thereafter outputting the data from said third memory means; and at least one utilization device coupled to said third memory means and being responsive to the electrical communications signals outputted therefrom to perform a desired task depending upon the nature of said electrical communications signals fed thereto.

2. A communications system for electrical signals, comprising in combination:

a plurality of input signal sources generating respective electrical communications signals;

first memory means coupled to at least one of said plurality of input signal sources and including control means for controlling the inputting and storing of said electrical communications signals in said first memory and upon command thereafter outputting said electrical communications signals therefrom;

RF transmitter means coupled to said first memory means and being responsive to the electrical communications signals outputted from said first memory means to generate a modulated signal including said electrical communications signals and coupling said carrier signal to an RF communications link;

RF receiver means coupled to the RF communications link and being responsive to said carrier signal to demodulate the carrier signal to reproduce said electrical communications signals;

second memory means coupled to said RF receiver means and including control means for controlling the inputting and storing of said electrical communications signals in said second memory means and upon another command, thereafter outputting the stored electrical communications signals from said second memory means;

optical transmitter means coupled to said second memory means and being responsive to said electrical signals outputted from said second memory means to generate a modulated optical carrier signal including said electrical communications signals and coupling said carrier signal to an optical communications link;

optical receiver means coupled to the optical communications link and being responsive to said optical carrier signal to demodulate the carrier signal to reproduce said electrical communications signals;

third memory means coupled to said optical receiver means and including control means for controlling the inputting and storing of said communications signals into said third memory means and upon yet another command thereafter outputting the data from said third memory means; and at least one utilization device coupled to said third memory means and being responsive to the electrical communications signals outputted therefrom to perform a desired task depending upon the nature of said electrical communications signals fed thereto.

3. The communications system as defined by claim 2 wherein said plurality of input signal sources comprises digital data signal sources generating respective digital data signals and wherein said first, second and third memory means comprises digital memories.

4. The communications system as defined by claim 3 wherein said digital memories are comprised of random access memories.

5. The communications system as defined by claim 4 wherein said plurality of digital data sources are comprised of diverse types of digital data sources.

6. The communications system as defined by claim 2 wherein at least one utilization device comprises a plurality of diverse types of digital data utilization devices.

7. The communications system as defined by claim 3 wherein at least one of said control means of said first, second and third memory means includes selectively actuable cycle out switch means to cause the respective memory means to output the data stored therein.

8. The communications system as defined by claim 7 wherein at least one cycle out switch means comprises a manually actuable switch.

9. The communications system as defined by claim 7 wherein said at least one cycle out switch means is included in the memory control means of said third memory means.

10. The communications system as defined by claim 7 wherein said at least one cycle out switch means is included in said control means of said second memory means.

11. The communications system as defined by claim 7 wherein said at least one cycle out switch means is included in said control means of said first memory means.

12. The communications system as defined by claim 3 and additionally including an analog signal source, generating an analog input signal, coupled to said RF transmitter means, said RF transmitter means also being responsive to said analog input signal to generate a modulated RF carrier signal also including said analog input signal;

said RF receiver means being responsive to said carrier signal including said analog input signal to demodulate the carrier signal to reproduce said analog input signal; and analog signal transducer means coupled to said RF receiver means and being responsive to said analog signal to reproduce said analog signal.

13. The communications system as defined by claim 12 and additionally including signal conversion means coupled between said first memory means and said RF transmitter means, and wherein said RF transmitter means includes means for modulating said carrier signal with both said data signals and said analog signal.

14. The communications system as defined by claim 3 wherein said first, second and third digital memories comprises memories having plural parallel input and output data lines and additionally including an input parallel line data bus coupled to the input lines and an output parallel line data bus coupled to the output lines.

15. The communications system as defined by claim 14 and additionally including a parallel-to-serial digital data converter coupled to the output of said first memory via said output data bus for providing a serial data system of digital data, and wherein the input data bus of said first memory is coupled to said at least one of said plurality of digital data sources.

16. The communications system as defined by claim 15 and additionally including signal converter means coupled to said parallel-to-serial digital data converter for providing a signal conversion of said serial data stream, and wherein said RF transmitter means includes modulation means for modulating said carrier signal with said converted signals.

17. The communications system as defined by claim 16 wherein said RF receiver means additionally includes demodulator means to demodulate the carrier signal to reproduce said converted signals;

signal reconversion means coupled to said converted signals to again provide said serial data stream;

a serial-to-parallel converter coupled to said reconversion means and being adapted to produce a parallel digital data stream of said digital data signals which in turn are coupled to said second memory via its respective input data bus; and a parallel-to-serial signal converter coupled to said second memory via its respective output data bus to provide a serial digital data stream of said digital data signals to said optical transmitter means.

18. The communications system as defined by claim 17 wherein said optical transmitter means includes a light emitting source.

19. The communications system as defined by claim 18 wherein said light emitting source comprises a light emitting semiconductor device.

20. The communications system as defined by claim 18 wherein said light emitting source comprises a light emitting diode.

21. The communications system as defined by claim 17 and additionally including means for providing a selective data transfer path to said second memory.

22. The communications system as defined by claim 21 wherein said last recited means comprises a filter circuit.

23. The communications system as defined by claim 21 wherein said last recited means comprises a filter circuit coupled between said demodulator means and said reconverter means.

24. The communications system as defined by claim 17 and additionally includes a serial-to-parallel signal converter coupled between said optical receiver means and the input data bus of said third memory for applying said digital data as a parallel data stream to said third memory; and a parallel-to-serial converter coupled to the output data bus of said third memory for providing a serial data stream of said digital data for coupling to said at least one utilization device.

25. The communications system as defined by claim 24 wherein said first, second and third memories are random access memories.

26. The communications system as defined by claim 24 wherein said optical receiver means includes a photo pickup device.

27. The communications system as defined by claim 26 wherein said photo pickup device comprises a photosensitive semiconductor device.

28. The communications system as defined by claim 27 wherein said semiconductor device comprises a photodiode.

29. The communications system as defined by claim 3 wherein said optical communications link includes a gaseous transmission medium.

30. The communications system as defined by claim 3 wherein said optical communications link includes a vacuum or space transmission medium.

31. The communications system as defined by claim 2 wherein said optical communications link includes at least one optical fiber linking said optical transmitter means to said optical receiver means.

32. The communications system as defined by claim 1 wherein at least one of said input signal sources comprises a portable device.

33. The communications system as defined by claim 32 and additionally including optical coupling means coupling said at least one portable device to said first memory means.

34. The communications system as defined by claim 1 wherein said third memory means comprises a portable device.

35. The communications system as defined by claim 1 wherein said second energy type communications link includes inductive coupling means coupling said second energy type transmitter means to said energy type receiver means.

36. The system as defined in claim 17 wherein said serial-to-parallel-to-converter embodies an addressable gate to control data flow to said second memory.

* * * * *